United States Patent Office 2,995,603
Patented Aug. 8, 1961

2,995,603
CORROSION PREVENTION AGENT
Charles Bryce Hutchison, Webster Groves, Mo., assignor to Petrolite Corporation, Wilmington, Del., a corporation of Delaware
No Drawing. Original application Nov. 30, 1956, Ser. No. 625,249, now Patent No. 2,944,968, dated July 12, 1960. Divided and this application Aug. 20, 1957, Ser. No. 679,155
7 Claims. (Cl. 260—557)

This application is a division of my copending application Serial No. 625,249, filed November 30, 1956, now Patent No. 2,944,968.

This invention is concerned with a new composition of matter, method of making same and prevention of corrosion. The herein defined products are specifically useful as corrosion inhibitors as described subsequently in detail. However, such products have use as other than corrosion inhibitors as, for example, asphalt additives of the kind commonly employed to increase the adherence of asphalt to mineral aggregates; in the form of salts, particularly gluconic acid salts that are effective as bacteria inhibitors particularly for use in secondary recovery of petroleum; they may be used as intermediates, for instance, reacted with alkylene oxides particularly ethylene oxide, propylene oxide to give surfactants, some of which are oil soluble, some of which are water soluble, and some of which are soluble in both oil and water.

More specifically, this invention relates to the soluble basic reaction product obtained by heating below the pyrolytic point a diamide of the formula

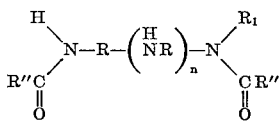

in which R″CO is the naphthenyl radical of a naphthenic acid within the molecular weight range of 200 to 500; R is an alkylene radical having not over 6 carbon atoms, $R_1$ is a member of the class selected from hydrogen and low molal alkyl radicals having less than 8 carbon atoms, and $n$ is a small whole number varying from 1 to 4; said diamide derived product involving at least one of two reactions of the class consisting of polymerization and dehydration; said product being further characterized by the absence of a cyclic amidine structure and said dehydration of the diamide eliminating from .5 to 1.5 moles of water per molecule of diamide.

The use of a corrosion inhibiting agent in the oil industry and other industries, and particularly for the protection of ferrous metals, is well known. For example, see U.S. Patents No. 2,736,658, dated February 28, 1956, to Pfohl et al., and 2,756,211 dated July 24, 1956, to Jones, and 2,727,003 dated December 13, 1955, to Hughes.

For convenience, what is said hereinafter will be divided into seven parts:

Part One is concerned with the composition or structure of the non-cyclic dehydration and/or polymerization products obtained by the elimination of one mole of water, or approximately so, from a diamide:

Part Two is concerned with polyamines of the kind suitable for reactants in the preparation of the herein described corrosion inhibiting agent;

Part Three is concerned with naphthenic acids;

Part Four is concerned with the preparation of the herein described new compositions or corrosion inhibitors and for purpose of convenience will be divided into two sections; Part Four, Section A, is concerned with the preparation of diamides; Part Four, Section B, is concerned with the preparation of dehydration and/or polymerization products by elimination of one mole of water or a substantial fraction thereof from the diamide. Needless to say, the herein described dehydration and/or polymerization product is obtained on a practical scale in a single step operation. One need not stop at the diamide stage and then convert. However, the products are best characterized by noting the structure of the diamide and thus for purpose of convenience such presentation is herein employed.

Part Five is concerned with mixing the corrosion inhibiting agent with suitable solvents or converting it into salts in which oil solubility or at times water solubility is increased, so as to yield a product most suitable for use in oil field or refinery practice by means of a metering pump, and also more useful in other industrial applications;

Part Six is concerned with specific examples of the utility and effectiveness of the herein described corrosion inhibitors; and Part Seven is concerned with uses for the herein described products for purposes other than corrosion inhibition.

PART ONE

The formation of diamides from a monocarboxy acid and a polyamine is well known. The conversion of a monoamide or a diamide, as the case may be, into cyclic amidine, such as an imidazoline, is well known. For instance, in the case of stearic acid and tetraethylene pentamine it may be illustrated thus:

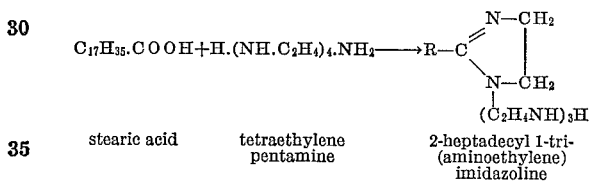

| stearic acid | tetraethylene pentamine | 2-heptadecyl 1-tri-(aminoethylene) imidazoline |

However, if one examines the structural formulas of a typical naphthenic acid of the kind herein employed as described in Part Three following, it is obvious that stearic hindrance would be expected to prevent the formation of the cyclic amidines. See, for example, J.A.C.S., vol. 61, Nov. 19, 1939, pp. 3195–7. The author is Aspinall. Such specific explanation in respect to such reaction, or similar reaction, appears in U.S. Patent No. 2,291,396, dated July 28, 1942, to Lieber, as follows:

"Although the mechanism of the operation of this invention is not well understood, it is believed that the following reactions occur:

(1) Salt formation:
$H_2NCH_2CH_2NHCH_2CH_2NH_2 + R.COOH \longrightarrow$
$R.COOH_3NCH_2CH_2NHCH_2CH_2NH_3OOC.R$ $\downarrow$ Heat ($-H_2OO$)

(2) Amide formation:
$R.COHNCH_2CH_2NHCH_2CH_2NHOC.R$ (3) Polymerization by intermolecular nitrile formation: (e.g. from 2 mols of above) $\downarrow$ Heat ($-H_2O$)

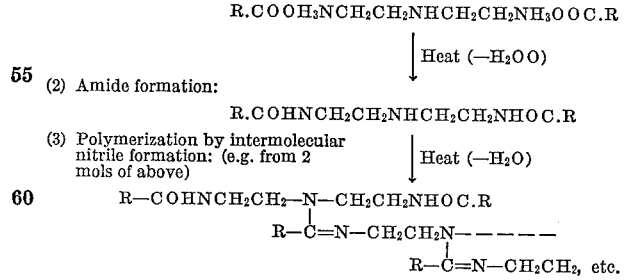

"Also, intra-molecular nitrile formation is possible. There is also a possibility that upon heating, the OH group of the fatty acid may combine with a hydrogen in the amine compound, for instance, with the hydrogen in the NH group, with the resultant liberation of water vapor and the consequent formation of an acyl derivative of the polyalkylene polyamine and subsequent polymerization."

The above reaction of course is a conventional one and in essence depends on the migration of the hydrogen atom attached to nitrogen to the oxygen atom double bonded to carbon, thus forming a single bonded hydrogen atom and the double bond between the carbon and nitrogen atoms.

However, in the preparation of products following the use of naphthenic acids even with a triamine the final product invariably is basic indicating the presence of at least one basic nitrogen radical. Further attention is directed to the infrared spectrogram of a product of the kind described in Part Four and derived from the reaction of one mole of diethylene triamine and 2 moles of naphthenic acid with elimination of 3 moles of water. Examination of the infrared spectrogram clearly indicates the absence of a cyclic amidine (imidazoline) radical and thus is in agreement with the Aspinall reference as above noted. For this reason the herein specified products have been characterized as the basic derivatives obtained from polyamines of the kind described in Part Two in combination with the acids described in Part Three with the proviso that the initial reactant ratio be two parts of acid to one of amine with the elimination of any excess, with two moles of water and not over 3.5 moles of water per mole of amine without ring formation.

PART TWO

The polyamines employed are alkylene polyamines having at least 3 basic nitrogen atoms and characterized by the fact that they are terminally acylation susceptible so as to yield diamides, i.e., susceptible to acylation in each terminal position. They correspond to the following formula:

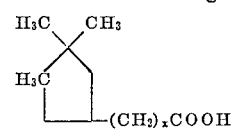

in which R is an alkylene radical having not over 6 carbon atoms.

$R_1$ is a member of the class selected from hydrogen and low molal alkyl radicals such as methyl, ethyl, butyl, etc., but in any event having less than 8 carbon atoms. For this purpose the cyclohexyl radical is considered the same as a hexyl radical, and $n$ is a small whole number varying from 1 to 4.

Generally speaking, the alkylene radicals are selected from the class consisting of

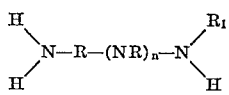

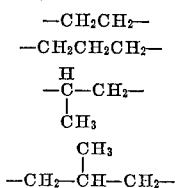

They may consist, however, of a hexamethylene radical, i.e., as many as 6 carbon atoms.

As is well known, low molal amines, such as methyl amine, ethylamine, or cyclohexylamine, can be treated with either 2 moles of ethylene imine or two moles of acrylonitrile followed by reduction to yield amines of the type in which R' is a low molal alkyl group and $R_1$ and $R_2$ are hydrogen. The two occurrences of R need not be identical as, for example, similar reactants involving ethylene diamine and propylene imine, or ethylene diamine and one or two moles of acrylonitrile, followed by reduction.

However, for all practical purposes the most readily available amines which are suitable are ethylene diamine, diethylene triamine, triethylenetetramine, tetraethylenepentamine and mixtures of higher amines such as hexamines, heptamines, etc.

Another suitable amine, although higher in price than those above noted, is 3,3′-iminobispropylamine.

PART THREE

The monocarboxy acids employed in the present invention as reactants are naphthenic acids. As to the description of naphthenic acids reference is made to Industrial and Engineering Chemistry, vol. 41, No. 10, October 1949, pages 2080–2090, as follows:

"The most widely used is naphthenic acid, a petroleum refining by-product obtained when the alkali liquor from the caustic treatment of gas oil is acidified with sulfuric acid. This treatment produces a dark brown (about 12 on the Gardner color scale when cut 1 to 9 with mineral spirits) oily liquid which separates to the top of the aqueous liquor. The mixed acids can be divided roughly into three groups having the general formulas: $C_nH_{2n}O_2$, $C_nH_{2n-2}O_2$, and $C_nH_{2n-4}O_2$. The first group occurs largely in the lower boiling fraction of the mixture. They usually contain 6 or 7 carbon atoms and are colorless. The second group, usually the largest, contains acids of 8 to 12 carbon atoms having the structure:

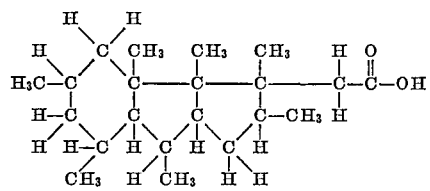

The third group contains the heaviest molecules which are polycyclic and have from 12 to 23 carbon atoms. All fractions from a carefully distilled naphthenic acid (24) contain some color which, so far, has proved impossible to remove. Tarry residues account for the dark color of the crude, but these are largely removed by distillation. Since naphthehic acids are saturated and primarily cyclic, their soaps have much greater stability than those of other common liquid acids. The crude acid as delivered has a density of 8.04 to 8.44 pounds per gallon and a viscosity of 1.25 poises at 77° F. The acid values range from 160 to 270, but naphthenic acid used for soap manufacture usually has an acid value between 220 and 230. pH of the water extract is about 5.5 and the iodine value between 8 and 11. Unsaponifiables are held below 12%. The initial boiling points vary widely from shipment to shipment. Individual batches have boiled below 200° F. and up to almost 400° F. at 3.5 inches of mercury."

A typical formula in connection with some of the commercially available naphthenic acids is the following:

These particular acids are available in at least three different grades; Grade one having an average molecular weight of 290–300. Generally speaking, there is present about 6% of non-saponifiables and this type is perhaps characteristic of the most common commercially available naphthenic acid.

Grade two has a somewhat higher molecular weight, for instance 320–330 and contains about 8% of non-saponifiable matter. Grade three, which finds considerable utility, has a molecular weight range of 410–420 and contains about 10% non-saponifiable matter.

Any naphthenic non-amidine forming acid may be used but preference is to use the commercial grades above described, or in some instances, mixtures of two different grades so as to give, for example, an average molecular weight of 360 to 370 in some instances, and in others, a molecular weight of about 310, or thereabouts.

In examing the formula immediately preceding, with the formula preceding the above formula, and ignoring difference in the cyclic structure of the naphthenic acids, it is apparent that in at least some naphthenic acids which are available commercially the cyclic structure is part of the beta carbon atom. On the other hand, as far as is known, and referring to the formula

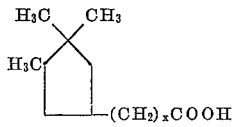

there are available naphthenic acids in which apparently $x$ in the formula represents a small whole number, for instance, 3 or 4 or the like. There is no reason to believe such naphthenic acids cannot be converted into cyclic amidines.

The present invention is limited to naphthenic acids commercially available which do not form cyclic amidines. The claims specify that the product be free from a cyclic amidine structure, i.e., from an imidazoline structure, or a tetrahydropyrimidine structure. There is no difficulty in verifying the nature of the finished product in this respect. All that is necessary is appropriate infrared spectrogram which shows the absence of a cyclic amidine structure.

PART FOUR

Section A

As has been pointed out previously, the manufacture of diamides from one mole of a polyamine of the kind herein employed as a reactant and 2 moles of naphthenic acid, is a procedure that is well known and simply means heating under such conditions as will convert the salt form into an amide by the elimination of 2 moles of water per mole of polyamine. The reaction sometimes is conducted by merely heating, other times by heating in vacuum, and other times using an insoluble solvent such as xylene to eliminate water formed. However, for the majority of purposes there is no need for a two-step process and thus Part Four, Section B, following includes data which in part is pertinent to the manufacture of a diamide.

PART FOUR

Section B

The naphthenic acids herein employed for the purpose of convenience may be indicated thus: R″COOH in which RCO is the naphthenyl radical. In light of what has been said previously it is obvious that by reacting one mole of a suitable polyamine with 2 moles of a suitable naphthenic acid one could readily obtain a diamide, thus:

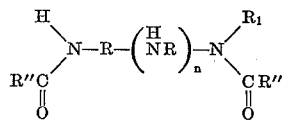

in which the various characters have their previous significance.

More specifically then, the new compositions herein described and particularly effective as corrosion inhibitors, are characterized by the soluble basic reaction product obtained by heating below the pyrolytic point a diamide of the formula

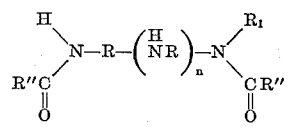

in which R″CO is the naphthenyl radical of a naphthenic acid within the molecular weight range of 200 to 500; R is an alkylene radical having not over 6 carbon atoms; $R_1$ is a member of the class selected from hydrogen and low molal alkyl radicals having less than 8 carbon atoms, and $n$ is a small whole number varying from 1 to 4; said diamide derived product involving at least one of two reactions of the class consisting of polymerization and dehydration; said product being further characterized by the absence of a cyclic amidine structure and said dehydration of the diamide eliminating from .5 to 1.5 moles of water per molecule of diamide.

In light of re-examination of the data, it seems it is quite likely the effective agent may be a nitrile amide, i.e., one terminal being an amide group, the other one a nitrile group, thus:

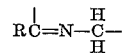

It has been pointed out previously there seems to be no question as to the composition of the diamide intermediate but there is a question as to the structure of the dehydration and/or polymerization product obtained by the elimination of one mole of water, or approximately one mole of water, from the diamide. This has been discussed in Part One, preceding.

In preparing the herein described compounds in a single step operation, it is preferred to mix the 2 moles of naphthenic acid and 1 mole of diethylene triamine and add benzene or xylene in order to make the mixture more fluid, and also to form azeotropes to carry overhead the water formed in the reaction. The mixture is then heated until water ceases to evolve overhead, the entrainer being continuously returned to the reaction vessel. When the reaction temperature reaches an equilibrium so that the temperature can no longer be raised because all the heat is being used to vaporize the entrainer, the entrainer, such as benzene or xylene, is removed as it distills off. The reaction may then be heated to about 280° C. for about 2 hours in order to be sure that the reaction has been driven to completion, although this maintained heating is not absolutely necessary.

As pointed out for purpose of describing the invention reference is made to a two-step process which can be a single-step process as above noted. Under certain conditions, however, there is an advantage to a two-step process. For example, mixing two different diamides and then subjecting the mixture to the dehydration (or polymerization) step. It is doubtful that any specific example is required in any detail but purely by way of explanation the following is included. (Examples 1 to 4 appear in tabular form in Tables 1 and 2 along with tabulaiton of Example 5 and other examples.)

Example 5

To 352.0 grams of naphthenic acid (1.0 mol.) and 51.5 grams diethylene triamine (0.5 mol.), 50 ml. of xylene was added. The mixture was heated under a water trap condenser in order to distill the water-xylene azeotrope mixture, with the xylene being returned continuously from the Dean and Stark water trap to the reaction mixture. After about a 2-hour reaction period, during which the water was removed from the trap to a graduate, the xylene also was removed from the trap as it condensed. The reaction was heated continuously until 280° C. was reached, and then maintained at this temperature for about 2 hours to insure that the reaction had been driven to completion, although this maintained heating is not absolutely necessary. The resulting product was a dark brown resin of such high viscosity that it did not flow readily at room temperature. The product was soluble in isopropyl alcohol, and the full range of hydrocarbons, including crude oil, kerosene and isooctane.

Note Example 5 is described again in tabular form with all the pertinent data in Tables 1 and 2, following. Note also that Tables 1 and 2 illustrate a large number of examples of the present invention.

TABLE I

Dehydration and/or polymerization products derived by elimination of one mole of water, or a substantial fraction thereof, from a diamide of the following formula:

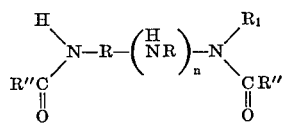

| Ex. No. | Naphthenyl radical from acid having mol. weight of approximately | R | R₁ | n |
|---|---|---|---|---|
| 1 | 323 | C₂H₄ | H | 1. |
| 2 | 323 | C₂H₄ | H | 2. |
| 3 | 323 | C₂H₄ | H | 3. |
| 4 | 352 | C₂H₄ | H | 1. |
| 5 | 352 | C₂H₄ | H | 1. |
| 6 | 352 | C₂H₄ | H | 3. |
| 7 | 450 | C₂H₄ | H | 1. |
| 8 | 450 | C₂H₄ | H | 2. |
| 9 | 450 | C₂H₄ | CH₃ | 3. |
| 10 | 323 | C₂H₄ | CH₃ | 2. |
| 11 | 352 | C₂H₄ | CH₃ | 2. |
| 12 | 450 | C₂H₄ | CH₃ | 2. |
| 13 | 323 | C₃H₆ | H | 1. |
| 14 | 352 | C₃H₆ | H | 1. |
| 15 | 450 | C₃H₆ | H | 1. |
| 16 | 352 | C₃H₆ | CH₃ | 1. |
| 17 | 323 | C₂H₄ | C₁₂H₂₅ | 1. |
| 18 | 352 | C₂H₄ | C₁₂H₂₅ | 1. |
| | | | | Mixtures, parts |
| 19 | 323 | C₂H₄ | H | 1 part n=2, 1 part n=1. |
| 20 | 352 | C₂H₄ | H | Do. |
| 21 | 450 | C₂H₄ | H | Do. |
| 22 | 352 | C₂H₄ | H | 1 part n=3, 3 parts n=1. |
| | Mixtures, parts | | | |
| 23 | 1 part M.W. 323, 1 part M.W. 352. | C₂H₄ | H | 1. |
| 24 | 1 part M.W. 352, 2 parts M.W. 450. | C₂H₄ | H | 2. |
| 25 | 1 part M.W. 200, 1 part M.W. 450. | C₃H₆ | H | 1. |

TABLE II

Dehydration and/or polymerization products derived by elimination of one (½ to 1½) mole of water, or a substantial fraction thereof, from two diamides of the following formula:

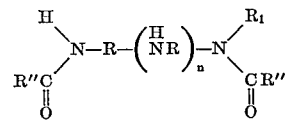

| Ex. No. | Time of heating (hours) | Maximum temperature of heating, °C. | Amount water eliminated (mols) |
|---|---|---|---|
| 1 | 3 | 280 | 0.9 |
| 2 | 3½ | 280 | 1.1 |
| 3 | 3 | 280 | 1.5 |
| 4 | 2 | 280 | 0.7 |
| 5 | 1 | 280 | 1.3 |
| 6 | 4 | 280 | 1.3 |
| 7 | 1½ | 280 | 0.9 |
| 8 | 4 | 280 | 1.2 |
| 9 | 2 | 280 | 1.4 |
| 10 | 1 | 260 | 1.1 |
| 11 | 2 | 260 | 1.2 |
| 12 | 2 | 260 | 1.4 |
| 13 | 4 | 280 | 0.8 |
| 14 | 1 | 275 | 0.9 |
| 15 | 1 | 280 | 1.1 |
| 16 | 4 | 280 | 0.5 |
| 17 | 3 | 275 | 0.5 |
| 18 | 2 | 280 | 0.8 |
| 19 | 3 | 280 | 1.0 |
| 20 | 2½ | 260 | 1.0 |
| 21 | 1 | 275 | 1.1 |
| 22 | 1 | 280 | 0.9 |
| 23 | 1 | 280 | 0.8 |
| 24 | 2 | 260 | 1.2 |
| 25 | 3 | 275 | 0.8 |

Examination of the tubular data reveals that in some instances as little as one-half mole of water is eliminated per diamide dehydration; in other instances, as much as 1½ moles per mole of diamide dehydration. Reducing this ratio to a whole number, it means that in some instances dehydration eliminates one mole of water from 2 moles of diamide, and in some instances eliminates as much as 3 moles of water from 2 moles of diamide. Re-examination of the previous formula concerned with polymerization by inter-molecular nitrile formation indicates the initial reaction might eliminate, and probably does eliminate, one mole of water from two moles and the diamide. Further reactions have taken place, particularly in derivatives, where there is more than one secondary amino radical, tetra-ethylene pentamine, for example, with the elimination of three moles of water from two moles of diamide.

The present invention is concerned with the use of materials in which a high molal group, i.e., 8 carbon atoms or more, is introduced by virtue of the naphthenyl radical. Although the preference is to use, for reasons of economy, the non-substituted amines such as diethylenetriamine, triethylenetetramine, tetraethylenepentamine, etc. The mono-substituted polyamines may be employed such as the monomethylated, monoethylated, or monobutylated, products, etc., provided the alkyl radical so introduced has less than 8 carbon atoms. This conforms to the requirement that the polyamino reactant have present at least 3 basic nitrogen atoms and a primary amino group and a secondary amino group.

There are available polyamines in which the terminal alkyl substituent has 8 carbon atoms or more, with particular reference to radicals obtained from fatty acids having 12, 14, 16, 18 or more carbon atoms. It has been found these products also can be used in the manner herein described and in some instances give considerably greater oil solubility and have some inherent advantages. Furthermore, they have the peculiar advantage that products can be made in which certain low molal acids which do not form cyclic amidines can be employed. Such variants are not included in the present invention.

Reference is made elsewhere to the fact that the herein described corrosion inhibitors can be used in combination with other well known corrosion inhibitors. Reference is made to the cyclic amidine structures, the amido cyclic amidine structures, and the amino cyclic amidine structures, as disclosed in aforementioned Blair and Gross Reissue Patent No. 23,227. When the herein described products are mixed with corrosion inhibintors of the conventional type in the ratio of one-to-three, one-to-one, three-to-one, or the like, in numerous instances the effectiveness of the corrosion inhibitor thus obtained is significantly greater than the use of either one alone. The reason is not understood but this particular combination is not included as part of the present invention.

Reference to the basic products herein described and particularly for use as corrosion inhibitors includes not only the products as such but also in salt form and particularly combinations which tend to increase the solubility in a selected solvent or system, as, for example, the addition of fatty acids, dimeric acids, naphthenic acids, or the like, to promote oil solubility; or the addition of acetic acid, hydroxyacetic acid, and the like, to promote solubility in a polar solvent such as water.

PART FIVE

Since these products are basic they can be combined with various acids to produce salts in which oil solubility is increased or decreased. Likewise, water solubility may be increased or decreased. For instance, the products may be mixed with one or more moles of an acid, such as higher fatty acids, dimerized fatty acids, naphthenic acids, acids obtained by the oxidation of hydrocarbons, as well as sulfonic acids such as dodecylbenzene sulfonic acid, petroleum mahogany acids, petroleum green acids, etc.

What has been said in regard to the acids which increase oil solubility and decrease water solubility applies with equal force and effect to acids of the type, such as acetic acid, hydroxyacetic acid, gluconic acid, etc., all of which obviously introduce hydrophile character when they form salts or complexes, if complexes are formed.

As pointed out previously, the addition of corrosion inhibitors, particularly in the form of a solution by means of a metering pump or the like, is common practice. The particular corrosion inhibitors herein described are applied in the same manner as other corrosion inhibitors intended for use for the same purpose. For sake of brevity, as to the use of the corrosion inhibitor and its solution in a suitable solvent such as mineral oil, methyl ethyl ketone, xylene, kerosene, high boiling aromatic solvent, or even water, reference is made to aforementioned Blair et al. patent, and particularly to columns 9 and 10, beginning with line 40 in column 9, through line 70 in column 10.

PART SIX

The effectiveness of the compositions in inhibiting the corrosiveness of oil field brines may be better and more fully understood by reference to certain tests which have been conducted using synthetic oil field brines and a hydrocarbon that is essentially kerosene. The compositions were evaluated by test procedure outlined in the publication of the National Association of Corrosion Engineers "Corrosion," volume 2, No. 1, "Correlation of the Results Obtained with Corrosion Inhibitors in the Laboratory and in the Field," by G. E. Purdy and William J. Ries.

Results of a typical test run are set forth in the following table, at inhibitor concentrations of 30 p.p.m.

| Inhibitor | Mol. ratio | Percent protection |
|---|---|---|
| None | | 0 |
| Commercial inhibitor A | | 75 |
| Commercial inhibitor B | | 89 |
| Commercial inhibitor C | | 83 |
| Commercial inhibitor D | | 76 |
| Commercial inhibitor E | | 75 |
| Commercial inhibitor F | | 89 |
| DET-naphthenic acid, apparent M.W. 323 (297) | 1:2 | 95 |
| DET-naphthenic acid, apparent M.W. 352 (330) | 1:2 | 95 |
| DET-naphthenic acid, apparent M.W. 450 (415) | 1:2 | 93 |
| TET-naphthenic acid, apparent M.W. 352 (330) | 1:2 | 91 |
| TET-naphthenic acid, apparent M.W. 450 (415) | 1:2 | 92 |
| DET-naphthenic acid, apparent M.W. 352 (330); M.W. 450 (415) | 1:1:1 | 93 |
| DPT-naphthenic acid, apparent M.W. 352 (330) | 1:2 | 93 |
| TEP-naphthenic acid, apparent M.W. 323 (297) | 1:2 | 91 |
| DET, TET-naphthenic acid, apparent M.W. 323 (297) | 0.5:0.5:2 | 95 |

In the above tabular data, DET is an abbreviation for diethylene triamine, TET is an abbreviation for triethylene tetramine, DPT is an abbreviation for dipropylene triamine. In the last example a 50% mixture of a diamine and a triamine were employed.

Previous reference is made to the fact that commercial naphthenic acids frequently contain 6% to 10% of inert materials which cannot be economically separated. It is not unusual to ignore this fact in chemical molecular weight designation. Sometimes such molecular weights are referred to as "apparent molecular weight." In the above table note the naphthenic acid employed has been expressed by both designations, i.e., the apparent molecular weight frequently used in commerce and the true or equivalent molecular weight indicated by the figures in parentheses.

In the above tests under the conditions noted which are typical of many oil field conditions, six well known or widely used competing products gave protection varying from 75% to slightly under 90%; for instance, an average value might be considered in the upper 80's whereas the products herein described gave protection in the lower or middle 90's. In other words, an increased protection of approximately 8% to 10% was obtained using the same amount of corrosion inhibitor which it is believed would be available commercially at approximately the same price.

At first examination it may appear an increase, for example, from about 85% to 92.5% is not a large increase. The fact remains it is difficult to begin to push beyond 85% and even more difficult to push beyond 90%. Although the difference is not large it does point out the fact that comparatively few inhibitors under such conditions show increased effectiveness over a large number of available commercial inhibitors. Although the difference appears to be one of degree based on the percentage noted yet it is in fact a difference in kind.

It should be pointed out that the corrosiveness of well brines will vary from well to well, and proportion of corrosion inhibiting agent added to the well fluids also should be varied from well to well. Thus, in some wells it may be possible to effectively control corrosion by the addition of as little as 10 p.p.m. of the new compositions to the well fluids, whereas in other wells it may be necessary to add 200 p.p.m. or more.

PART SEVEN

As has been pointed out previously the herein described products are effective not only as corrosion inhibitors but can be used for a number of other purposes. For instance, as such they can be used as asphalt additives to increase the adhesiveness of the asphalt to the mineral aggregates. In the form of water soluble salts they may be used as bactericides in the secondary recovery of oil. They may be used as reactants to produce new and useful products. For instance, they may be subjected to oxyalkylation by means of ethylene oxide, propylene oxide, butylene oxide, or the like. The products may be oxyalkylated so as to produce products which still have oil solubility as, for example, by the addition of propylene oxide or butylene oxide. They may be oxyalkylated to produce water solubility as, for example, by means of ethylene oxide or glycide. They may be oxyalkylated by combinations of propylene oxide and ethylene oxide so that both water solubility and oil solubility remain. Such products are useful for a variety of purposes and particularly for those where nonionic surfactants or sequestered cationic surfactants, are indicated.

Having thus described my invention, what I claim as new and desire to secure by Letters Patent, is:

1. The soluble basic reaction product obtained by heating at an elevated temperature up to about 280° C. sufficient for amide dehydration to occur a diamide of the formula

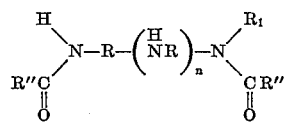

in which R"CO is the naphthenyl radical of a polycyclic naphthenic acid of the average type formula $C_nH_{2n-4}O_2$, having an average molecular weight within the range of 200 to 500 and in which the beta carbon atom is a part of a ring structure; R is an alkylene radical having not over 6 carbon atoms, $R_1$ is a member of the class selected from hydrogen and low molal alkyl radicals having less than 8 carbon atoms, and $n$ is a small whole number varying from one to four; said diamide derived product being obtained by a reaction involving polymerization by way of dehydration; said product being further characterized by the absence of a cyclic amidine structure and said dehydration of the diamide eliminating from .5 to 1.5 moles of water per molecule of diamide.

2. The product of claim 1 with the proviso that R is an ethylene radical and $R_1$ is a hydrogen atom.

3. The soluble basic reaction product obtained by heating at an elevated temperature up to about 280° C. sufficient for amide dehydration to occur a diamide of the formula

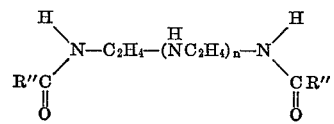

in which R″CO is the naphthenyl radical of a polycyclic naphthenic acid of the average type formula $C_nH_{2n-4}O_2$, of the average molecular formula $C_{21}H_{37}O_2$ and having an average molecular weight of 330, and $n$ is a small whole number varying from one to four; said diamide derived product being obtained by a reaction involving polymerization by way of dehydration; said product being further characterized by the absence of a cyclic amidine structure and said dehydration of the diamide eliminating from .5 to 1.5 moles of water per molecule of diamide.

4. The product of claim 3 wherein $n$ is 1.
5. The product of claim 3 wherein $n$ is 2.
6. The product of claim 3 wherein $n$ is 3.
7. The product of claim 3 wherein $n$ is 4.

References Cited in the file of this patent

UNITED STATES PATENTS

| | | |
|---|---|---|
| 2,291,396 | Lieber | July 28, 1942 |
| 2,322,201 | Jayne et al. | June 15, 1943 |
| 2,415,356 | Kellog et al. | Feb. 4, 1947 |
| 2,520,720 | Harman et al. | Aug. 29, 1950 |
| 2,598,213 | Blair | May 27, 1952 |
| 2,736,568 | Pfohl et al. | Feb. 28, 1956 |